United States Patent
Sano (10) Patent No.: US 8,144,971 B2
(45) Date of Patent: Mar. 27, 2012

(54) PATTERN MATCHING PROCESSING SYSTEM AND COMPUTER READABLE MEDIUM

(75) Inventor: Tsutomu Sano, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 466 days.

(21) Appl. No.: 12/379,104

(22) Filed: Feb. 12, 2009

(65) Prior Publication Data

US 2009/0232386 A1  Sep. 17, 2009

(30) Foreign Application Priority Data

Mar. 13, 2008  (JP) ................................ 2008-063572

(51) Int. Cl.
  *G06K 9/00* (2006.01)
(52) U.S. Cl. ........................................ 382/145; 382/146
(58) Field of Classification Search .................. 382/145, 382/146, 151

See application file for complete search history.

(56) References Cited

U.S. PATENT DOCUMENTS

2002/0181758 A1* 12/2002 Song .............................. 382/149

FOREIGN PATENT DOCUMENTS

JP  64-50433  2/1989

* cited by examiner

*Primary Examiner* — F. L. Evans
(74) *Attorney, Agent, or Firm* — McGinn IP Law Group PLLC (57) ABSTRACT

The pattern matching processing system includes: a recognition pattern-storage unit which stores a first image data obtained by picking up an image of at least a portion of a lead frame or a substrate of a first object and the second image data obtained by picking up an image of at least a portion of a lead frame of a second object that is different from the first object, respectively, and also stores one of the first image data and the second image data as an ordinary recognition pattern, and the other as an auxiliary recognition pattern; and a recognition unit, which recognizes input image data by a first pattern matching with the ordinary recognition pattern stored in the recognition pattern-storage unit, and also carries out the second pattern matching with the auxiliary recognition pattern when an error is caused in the first pattern matching.

12 Claims, 8 Drawing Sheets

| RECOGNITION PATTERN | ORDINARY ASSIGNMENT |
|---|---|
| RECOGNITION PATTERN MANUFACTURED BY COMPANY "A" | ∨ |
| RECOGNITION PATTERN MANUFACTURED BY COMPANY "B" | |
| | |

PATTERN MATCHING PROCESSING SYSTEM AND COMPUTER READABLE MEDIUM

This application is based on Japanese patent application NO. 2008-063,572, the content of which is incorporated hereinto by reference.

BACKGROUND

1. Technical Field

The present invention relates to a pattern matching processing system and a computer readable medium.

2. Related Art

Japanese Laid-open patent publication No. S64-50,433 (1989) describes a process for recognizing a position of a lead frame via a pattern recognition in a wire bonder, which provides a wire bonding for the lead frame containing semiconductor chips installed therein. The process described in Japanese Laid-open patent publication No. S64-50,433 is configured that multiple groups of patterns for recognition employed in the above-described recognition are selected from the pattern of the lead frame to prepare to consecutively conduct the recognition by the respective groups, and if a recognition for the foregoing group is failed, then a recognition for the next group is started.

However, increased recognition accuracy is required for, for example, fine pitch lead frames. Therefore, the recognized pattern may depend on a surface finish of plating, a level of thermal deformation due to slight difference of type of material, and a manufacturer. In such case, a problem of inaccurate recognition is caused even if a multiple groups of patterns are selected for the recognition from the patterns of a single lead frame, as described in Japanese Laid-open patent publication No. S64-50,433.

SUMMARY

According to one aspect of the present invention, there is provided a pattern matching processing system for conducting a pattern matching of an input image data with a previously prepared reference recognition pattern when an alignment of a plurality of pads in a semiconductor chip with a lead frame having a plurality of leads respectively coupled via bonding wires or a substrate having the leads formed therein is conducted, the input image data containing data being obtained by picking up an image of at least a portion of the leads, which are objects for the alignment, the system including: a storage unit, being capable of storing first image data, obtained by picking up an image of the lead frame or at least a portion of the substrate serving as a first object and second image data, obtained by picking up an image of the lead frame or at least a portion of the substrate serving as a second object that is different from the first object, respectively, and also storing one of the first image data and the second image data as an ordinary recognition pattern and the other as an auxiliary recognition pattern, the first image data and the second image data serving as the recognition pattern; and a recognition unit, being conducting a recognition of the input image data via a first pattern matching with the ordinary recognition pattern stored in the storage unit, the recognition unit conducting a second pattern matching with the auxiliary recognition pattern stored in the storage unit if an error is generated in the first pattern matching.

Here, the first object and the second object may be designed to be capable of being coupled to a plurality of pads in the same semiconductor chip. As described above, the lead frame or the substrate including a plurality of leads, which is capable of being coupled to the same semiconductor chips through bonding wires should basically have similar configurations. However, the manufactures at the different conditions such as different manufacturers, different manufacturing sites, different manufacturing period of time, different manufacture lots and the like may possibly cause different processing status, even if the products were manufactured under the same design. Therefore, different surface conditions of the leads such as different plating thickness of the lead, different oxidation level and the like or different fine geometry may be caused. In addition, even if the products were simultaneously manufactured, the surface conditions of the lead may be varied when a certain amount of time have been passed after the manufacture. When images of such products are picked up to obtain the image data, it may be recognized that the patterns are different. In particular, when a fine pitch lead is included, such recognition error is easily generated.

Since multiple types of image data obtained by picking up images of different objects are prepared as patterns for recognition according to the configuration of the above-described pattern matching processing system, for example, when an error is caused in the pattern matching process employing an ordinary recognition pattern during the process for the recognition of the fine pitch lead, a pattern matching process employing an auxiliary recognition pattern can be conducted without stopping the processing due to an error. Therefore, the recognition of the fine pitch lead can be conducted with improved accuracy. Even if the wire bondings with the semiconductor chips are achieved in a condition that products manufactured by different manufacturers are employed, for example, the image data obtained by picking up the images of the products manufactured by different manufacturers are prepared, so that pattern matching of these images may be smoothly achieved.

According to the present invention, an alignment apparatus such as a wire bonder, a visual inspection apparatus and the like, which includes the above-described pattern matching processing system, is provided. Here, the term "alignment" may be meant that an alignment apparatus such as a wire bonder and the like comprehends and/or controls the positions of the lead frame or the substrate for providing the wire bonding. In addition, such alignment apparatus may include a moving mechanism such as transportation unit, which is capable of achieving an alignment of the lead frame or the substrate based on the results of the pattern matching, when the pattern matching is normally achieved by the recognition unit of the pattern matching processing system. In this case, the lead frame or the substrate may be physically moved to achieve an alignment.

Here, any arbitrary combination of each of these constitutions or conversions between the categories of the invention such as a process, a device and an apparatus, a system, a recording medium, a computer program and the like may also be construed as being fallen within the scope of the present invention.

According to the present invention, the recognition of the fine pitch lead can be achieved with improved accuracy.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Exemplary implementations according to the present invention will be described in detail as follows in reference to the annexed figures. In all figures, an identical numeral is assigned to an element commonly appeared in the figures, and the detailed description thereof will not be repeated.

Figure 1:
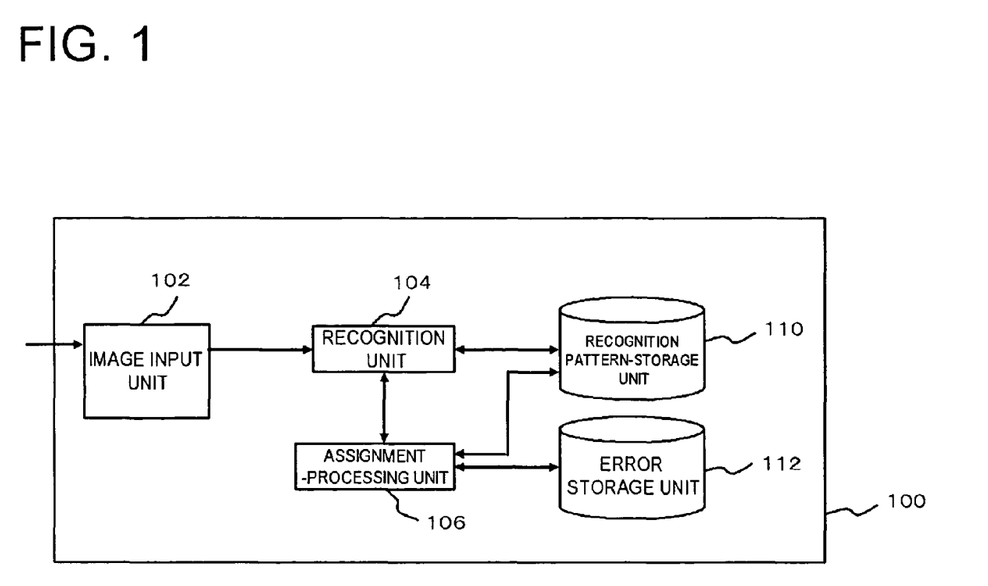
FIG. 1 is a block diagram, illustrating a configuration of a pattern matching processing system according to an embodiment of the present invention.

FIG. 1 is a block diagram, illustrating a configuration of a pattern matching processing system in the present embodiment.

Exemplary implementations for targeting a lead frame including a plurality of leads will be described in the following embodiments. A pattern matching processing system 100 provides a pattern matching processing for an alignment in a wire bonding process for a lead frame including a plurality of leads coupled to a plurality of pads in a semiconductor chip through bonding wires, respectively. More specifically, the pattern matching processing system 100 provides a pattern matching of input image data obtained by picking up an image of at least a portion of the lead frame serving as an alignment object with the recognition pattern that is previously prepared. In addition to above, in the present embodiment, the pattern matching processing system 100 may be configured to be incorporated in a wire bonder that provides an alignment of a lead frame serving as a wire bonding object for the wire bonding, or may be configured to control such wire bonder.

The Pattern matching processing system 100 includes an image input unit 102, a recognition unit 104, an assignment-processing unit 106, a storage unit 110 for a recognition pattern (storage unit) and an error storage unit 112.

In addition to above, in FIG. 1, configurations of sections/units, which are not related to the nature of the present invention, are not shown here. The respective components in the pattern matching processing system 100 shown in FIG. 1 exhibit blocks by the functional unit, instead of configurations by the hardware unit. The respective components of the pattern matching processing system 100 are achieved by an arbitrary combination of a software and a hardware, which typically includes a storage unit such as a central processing unit (CPU) of an arbitrary computer, a memory, a program for achieving the components in the drawing loaded by the memory, a hard disk that stores such program and the like, an interface for network connection and the like. It is understood by a person having ordinary skills in the art that various types of modified embodiments for a method for achieving the process and the apparatus are also included.

The image input unit 102 functions as inputting input image data obtained by picking up an image of at least a portion of the lead frame of the alignment object. Here, the input image data may be obtained by picking up an image of a portion of the lead frame of the alignment object corresponding to the recognition pattern employing in the case of the pattern matching.

The recognition pattern-storage unit 110 stores, as patterns for recognition, a first image data obtained by picking up an image of at least a portion of a lead frame of a first object and the second image data obtained by picking up an image of at least a portion of a lead frame of a second object, which is different from the first object, respectively. In addition, the recognition pattern-storage unit 110 stores one of the first image data and the second image data as an ordinary recognition pattern, and the other as an auxiliary recognition pattern.

Here, the first object and the second object may be configured of lead frames, which are designed to be able to be couple to a plurality of pads in the same semiconductor chip through bonding wires. As described above, the lead frames, which are able to be couple to a plurality of pads in the same semiconductor chip through bonding wires, should basically have the similar configurations. However, the manufactures at the different conditions such as different manufacturers, different manufacturing sites, different manufacturing period of time, different manufacture lots and the like may possibly cause different processing status, even if the lead frames were manufactured under the same design. Therefore, different surface conditions of the leads such as different plating thickness of the lead, different oxidation level and the like or different fine geometry may be caused. For example, different plating thicknesses for the leads may cause different reflectivity condition of light, and the image data obtained by picking up the image of such lead frame may possibly be recognized as different patterns. In addition, even in the case of the lead frames, which were simultaneously manufactured, the surface conditions of the leads for such lead frames may be different after longer time have passed after the manufacture. The images data obtained by picking up the images of such lead frames may be recognized as different patterns. In particular, such recognition error may easily be generated, when fine pitch leads are included therein.

The first object and the second object may be, for example, manufactured in different manufacturers. The manufactures by different manufacturers provide, for example, different plating conditions of leads, different processing conditions, or different fine patterns in fine sections. Alternatively, the first object and the second object may be, for example, lead frames, which are manufactured by the same manufacturer, but manufactured in different period of time, in different locations, and in different manufacturing lots. The manufactures in different period of time, in different locations, or in different manufacturing lots provides different plating conditions of leads, different processing conditions, or different fine patterns in fine sections, similarly as in the case of the manufactures by different manufacturers. Alternatively, the first object and the second object may be, for example, lead frames, which are manufactured by the same manufacturer, in the same period of time and in the same manufacturing lot, but may be stored in different conditions to provide different conditions of the surfaces. For example, when the lead frame is composed of copper, a change of color may be caused by oxidation. The change of color may be caused by a certain level of oxidation in the lead frames, which are manufactured in the same period of time, and the acquired image data of such lead frames may be recognized as different patterns.

In the present embodiment, the first image data and the second image data obtained by picking up the images of the first object and the second object respectively at different conditions as described above are prepared as patterns for recognition, so that a precise pattern matching with any of the patterns for recognition highly possibility may be achieved according to the conditions of the lead frame of the alignment object, leading to an accurate pattern matching.

Figure 2:
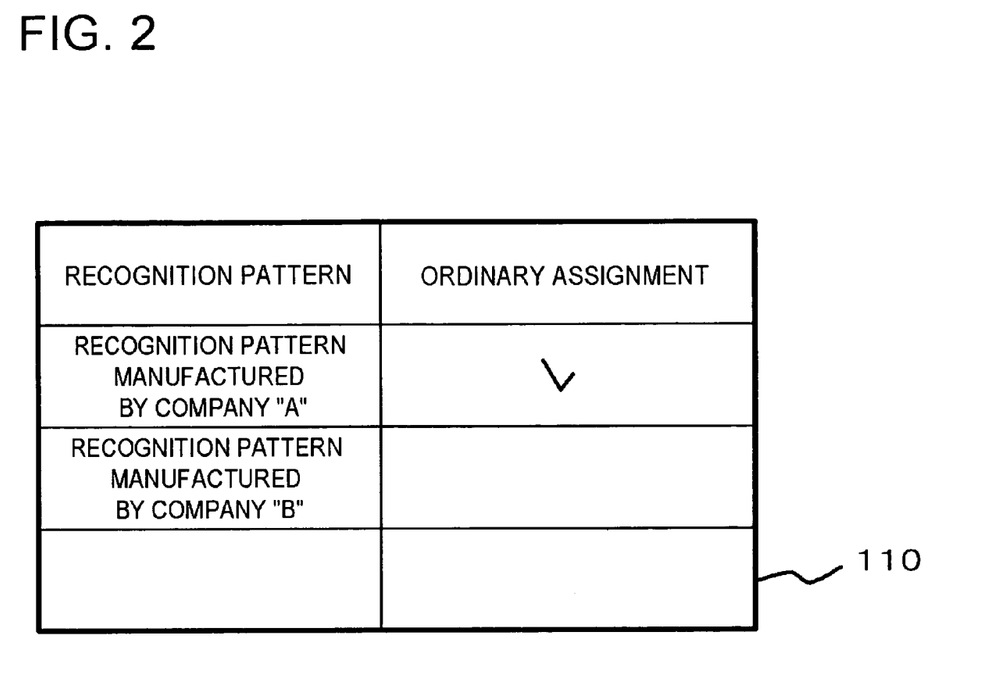
FIG. 2 is a diagram, schematically illustrating an example of an internal configuration of a recognition pattern-storage unit in the embodiment of the present invention.

FIG. 2 is a diagram, illustrating an example of an internal configuration of the recognition pattern-storage unit 110. Here, the recognition pattern-storage unit 110 stores a recognition pattern manufactured by company "A" and a recognition pattern manufactured by company "B". The recognition pattern manufactured by company "A" is defined as an ordinary pattern. The recognition pattern manufactured by company "A" and the recognition pattern manufactured by company "B" may be the image data obtained by picking up the images of the lead frames manufactured in company "A" and company "B" that is not company "A", respectively. While only two recognition patterns are illustrated here, the recognition pattern-storage unit 110 may be configured to store more recognition patterns. If a plurality of auxiliary recognition patterns are stored, the recognition pattern-storage unit 110 may be configured to store the respective auxiliary recognition patterns according to order of priority.

In addition, the recognition pattern-storage unit 110 may store information of sizes of the respective recognition patterns or positional information indicating which portion of the object are picked up, corresponding to the respective recognition patterns. Such configuration provides the judgment, on which location of the lead frame is taken when the input image data is acquired for the lead frame of the alignment object.

Figure 3A:
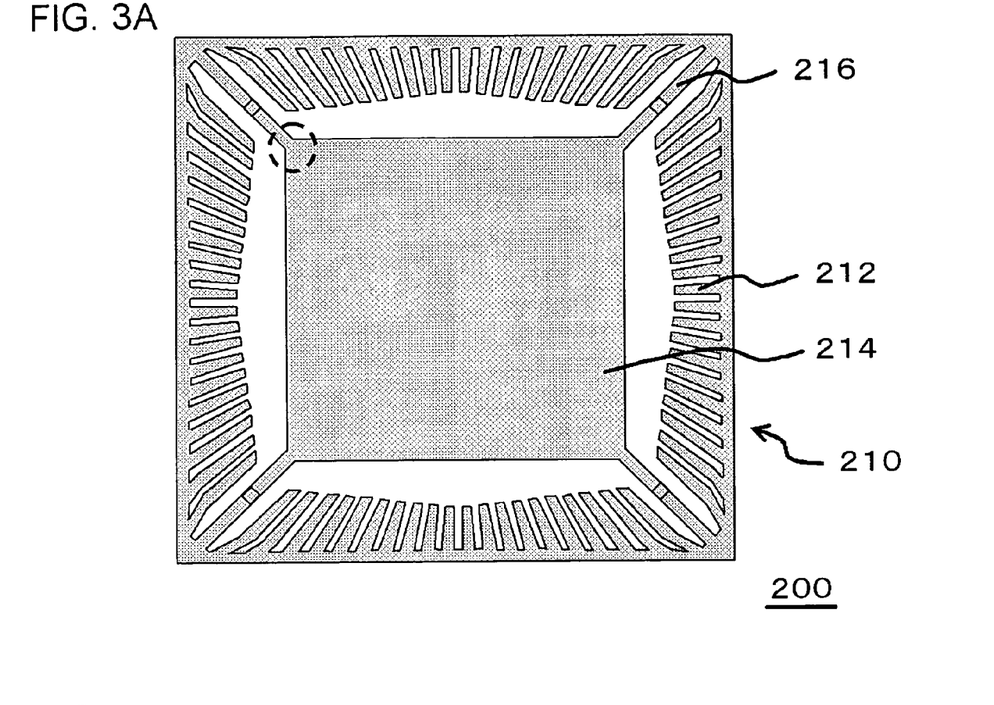
FIGS. 3A and 3B are diagrams, illustrating examples of recognition patterns manufactured in the embodiment of the present invention.
Figure 3B:
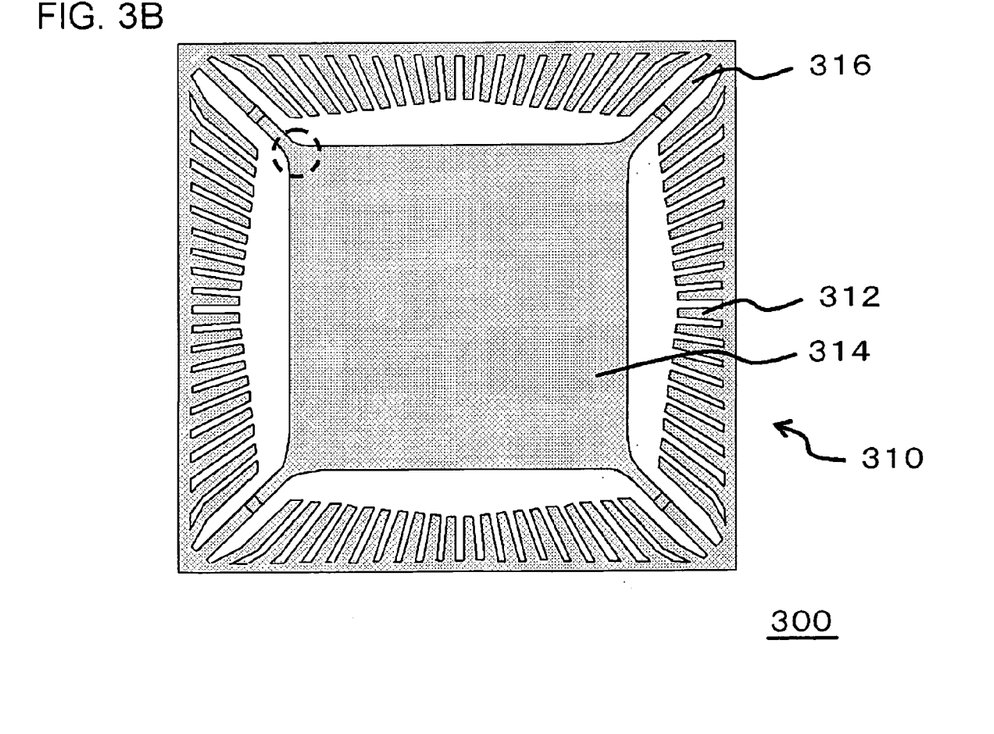

FIGS. 3A and 3B are diagrams, illustrating an example of a recognition pattern manufactured by company "A" and a recognition pattern manufactured by company "B", which are stored in the recognition pattern-storage unit 110. FIG. 3A illustrates a configuration of a recognition pattern 200 manufactured by company "A" that is the image data taken for the inner lead portion of the lead frame 210 manufactured by a company "A". The lead frame 210 includes a plurality of inner leads 212 coupled to a plurality of pads of a semiconductor chip through bonding wires, a die pad 214 for installing the semiconductor chip, and suspension leads 216 for retaining the die pad 214.

FIG. 3B illustrates a configuration of a recognition pattern 300 manufactured by company "B" that is the image data taken for the inner lead portion of the lead frame 310 manufactured by a company "B". The lead frame 310 includes, similarly as the lead frame 210, inner leads 312, a die pad 314 and suspension leads 316.

Here, the inner leads 212 of the lead frame 210 manufactured by a company "A" and the inner leads 312 of lead frame 310 manufactured by a company "B" have similar arrangement patterns. However, the lead frame 210 manufactured by company "A" and the lead frame 310 manufactured by company "B" have different fine geometries in connecting sections of the die pad and and the suspension leads surrounded by a circle of dotted line in the diagram. In this case, the connecting sections of the die pad 314 and the suspension leads 316 of the lead frame 310 are slightly rounded, as compared with the connecting sections of the die pad 214 and the suspension leads 216 of the lead frame 210. Enhancement in the accuracy of the pattern matching may highly possibly cause an error even in the case of different fine geometries. However, the lead frame of an alignment object may highly possibly be pattern-matched with any of these recognition patterns by preparing two types of such recognition patterns, providing improved recognition accuracy.

Returning to FIG. 1, the recognition unit 104 recognizes the input image data entered by the image input unit 102 by a pattern matching with the ordinary recognition pattern stored in the recognition pattern-storage unit 110. In addition, the recognition unit 104 carries out the pattern matching with the auxiliary recognition pattern stored in the recognition pattern-storage unit 110 when an error is caused in the pattern matching of the input image data and the ordinary recognition pattern.

Figure 4:
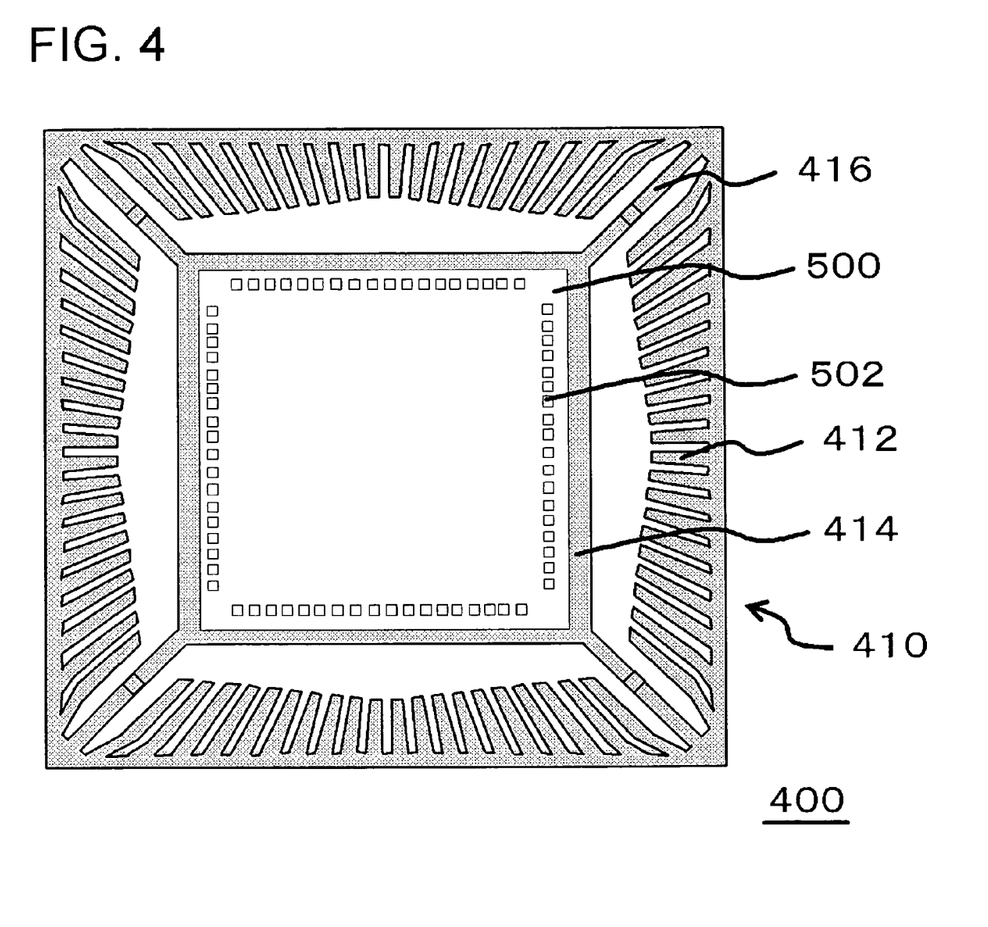
FIG. 4 is a diagram, illustrating an example of input image data in the embodiment of the present invention.

FIG. 4 is a diagram, illustrating an example of input image data that the image input unit 102 enters. The input image data 400 is image data obtained by taking an image of the inner lead portion of the lead frame 410 of the alignment object. The lead frame 410 includes a plurality of inner leads 412, a die pad 414 and a suspension lead 416. Here, transportation is made under the condition that the semiconductor chip 500 is installed on the die pad 414. Therefore, the input image data 400 is designed to include the semiconductor chip 500. A plurality of pads 502 are formed in the surface of the semiconductor chip 500. In the present embodiment, the pattern matching processing system 100 carries out the pattern matching in order to conduct an alignment of the lead frame 410 having the semiconductor chip 500 installed thereon with the wire bonder. Here, the term "alignment" is meant that the wire bonder comprehends and/or controls the positions of the lead frame 410 for providing the wire bonding.

Returning to FIG. 1, the assignment-processing unit 106 assigns the auxiliary recognition pattern as the ordinary recognition pattern and assigns the pattern, which was originally assigned to the ordinary recognition pattern, to new auxiliary recognition pattern, according to the results of the pattern matching with the ordinary recognition pattern by the recognition unit 104 and the pattern matching with the auxiliary recognition pattern. For example, the assignment-processing unit 106 replaces the auxiliary recognition pattern with the ordinary recognition pattern, when an error is caused in the pattern matching with the ordinary recognition pattern (first pattern matching) by the recognition unit 104 and when the pattern matching with the auxiliary recognition pattern (second pattern matching) is successfully repeated for a predetermined cycles or more. The assignment-processing unit 106 detects the condition of the error generation by the recognition unit 104 and the results of the subsequent pattern matching with the auxiliary recognition pattern, and the detected results are recorded in the error storage unit 112.

Here, advantageous effects obtainable by carrying out the assignments by the assignment-processing unit 106 as described above will be described. For example, an exemplary implementation of the pattern matching processing system 100 incorporated in the wire bonder will be described. In this case, the lead frames of the wire bonding objects are consecutively delivered in the locations for conducting the wire bonding of the wire bonder. In the wire bonder, the delivered lead frames are taken with a camera to generate input image data. Once the image input unit 102 of the pattern matching processing system 100 inputs the image data, the pattern matching is conducted by the pattern matching processing system 100.

Since the lead frames of the wire bonding object are processed in bunches, the products manufacture by the same manufacturer, the products manufactured in the same location, the product manufactured by simultaneous period of time or the like are possibly delivered in series. Once the products of the different manufacturer are delivered at a certain timing, the delivery of the products of such manufacturer is highly possibly continued for a while. In the present embodiment, when an error is caused in the pattern matching with the ordinary recognition pattern and when the pattern matching with the auxiliary recognition pattern is successfully repeated for predetermined cycles, it is highly possible that the delivered products are changed to the products manufactured by the different manufacturer. In such case, the ordinary recognition pattern is re-assigned, so that it is highly possible to subsequently conduct the normal pattern matching employing the ordinary recognition pattern, leading to the pattern matching with an improved efficiency.

Figure 5:
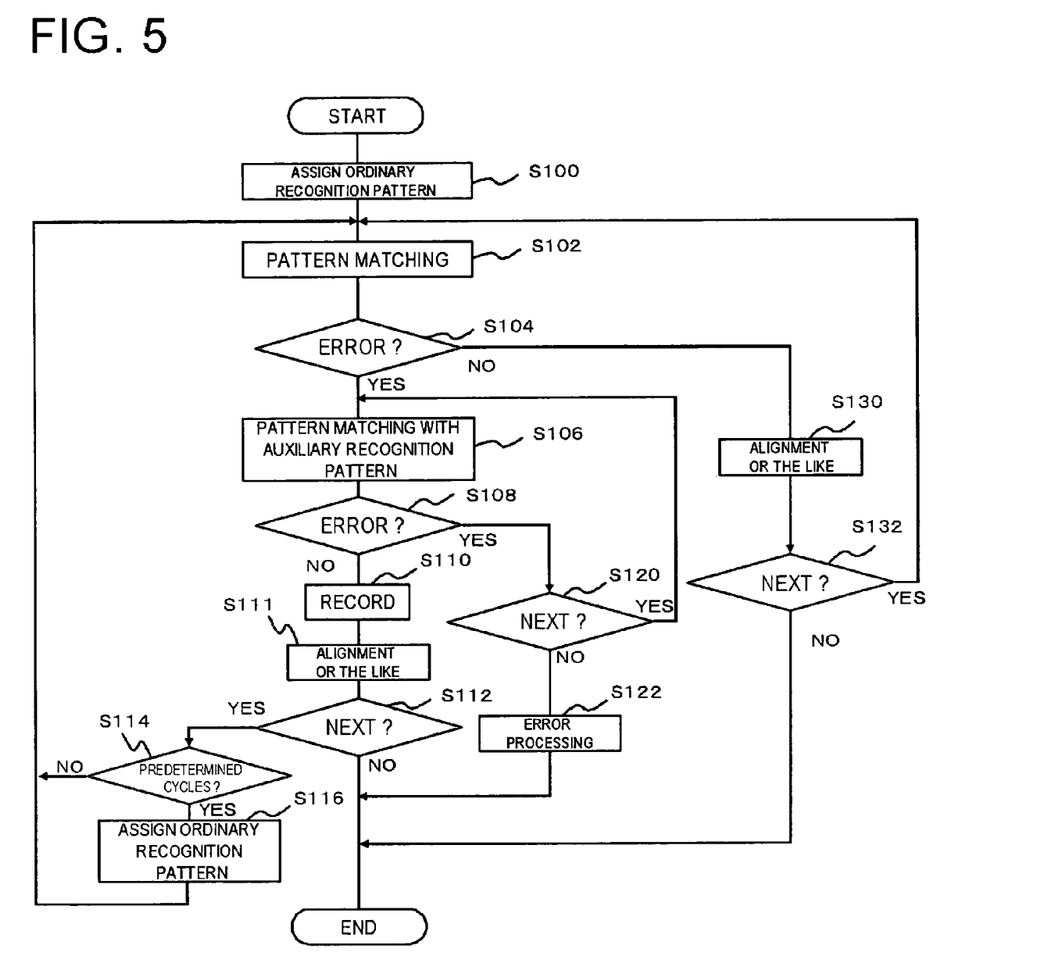
FIG. 5 is a flow chart, illustrating a procedure in a pattern matching processing system in the embodiment of the present invention.

FIG. 5 is a flow chart, illustrating a routine of the pattern matching processing system 100 in the present embodiment.

In such case, it is assumed that a plurality of the recognition patterns are stored in the recognition pattern-storage unit 110, as shown in FIG. 2. An ordinary recognition pattern is selected from these recognition patterns to be previously assigned (S100).

When a plurality of auxiliary recognition patterns are further included, a priority may be assigned to each of the auxiliary recognition patterns, and the assigned priority may be associated.

In such conditions, the input image data obtained by taking the image of the lead frame of the alignment object are consecutively acquired, and then the pattern matching with the recognition pattern stored in the recognition pattern-storage unit 110 is conducted to align the lead frame of the alignment object with the wire bonder.

When the image input unit 102 inputs the input image data of the lead frame of the alignment object, the recognition unit 104 refers to the recognition pattern-storage unit 110 to achieve the first pattern matching of the ordinary recognition pattern defined as the ordinary recognition pattern with the input image data (S102).

In this case, when the first pattern matching is achieved without causing an error (NO in S104), the alignment of the lead frame with the wire bonder is achieved based on the matching result.

In addition, the wire bonding is achieved by the wire bonder (S130). Hereafter, a judgment is made on whether the pattern matching of the lead frame of the next alignment object is sequentially conducted (S132), and when there is the next lead frame (YES in S132), the process is returned to the step S102 to repeat the similar operations. When there is no next lead frame in the step S132 (NO in S132), the processing is finished.

On the other hand, when the first pattern matching is not achieved to cause an error in the step S104 (YES in S104), the recognition unit 104 refers to the recognition pattern-storage unit 110 to conduct the second pattern matching of the auxiliary recognition pattern and the input image data (S106). Here, the recognition unit 104 sequentially conducts the second pattern matching from the highly prioritized auxiliary recognition pattern, when a plurality of auxiliary recognition patterns are stored in the recognition pattern-storage unit 110. When the second pattern matching is resulted without causing an error (NO of S108), the assignment-processing unit 106 records the results in the error storage unit 112 (S110). Further, based on the matching result, the alignment of the lead frame and the wire bonding are conducted (S111).

Subsequently, a judgment is made on whether the pattern matching of the lead frame of the next alignment object is sequentially conducted (S112), and when there is the next lead frame (YES in S112), the recognition pattern-storage unit 110 judges on whether the second pattern matching employing the auxiliary recognition pattern employed in the step S106 are successfully repeated for predetermined cycles (S114). If the second pattern matching employing the same auxiliary recognition pattern are successfully repeated for predetermined cycles (YES in S114), the recognition pattern-storage unit 110 re-assign the ordinary recognition pattern as the auxiliary recognition pattern (S116). Afterwards, the process is returned to the step S102, and the similar processes are repeated. On the other hand, if the second pattern matching employing the same auxiliary recognition pattern are not successfully repeated for predetermined cycles in the step S114, the process is returned to the step S102 without conducting the process of the step S116, and similar processing are repeated.

If an error is caused when the second pattern matching is conducted with the auxiliary recognition pattern in the step S108 (YES in S108), an judgment is made on whether other auxiliary recognition pattern is stored or not (S120), and if there is other auxiliary recognition pattern (in case of YES in S120), the second pattern matching is conducted with such auxiliary recognition pattern (S106). Besides, if there is no other auxiliary recognition pattern in the step S120, an error processing is conducted as it is assumed that the pattern matching cannot be achieved (S122). The error processing may be carried out as, for example, a termination of the processing, a processing of outputting an alert, and the like. The processing is finished as above.

Even if the first pattern matching employing the ordinary recognition pattern as described above results in causing an error, if the second pattern matching employing the auxiliary recognition pattern is repeated for a predetermined cycles or more, it is considered that, for example, the delivered lead frames of the alignment object are of different manufacturer. In such event, replacing the ordinary recognition pattern would reduce errors, leading to the pattern matching with an improved accuracy.

While FIGS. 3A and 3B illustrate the configuration of the recognition pattern 200 manufactured by company "A" and the recognition pattern 300 manufactured by company "B", both of which incorporate the entire lead frames, the recognition pattern 200 manufactured by company "A" and the recognition pattern 300 manufactured by company "B" may alternatively be configured to be image data obtained by taking an image of a part of the respective lead frames. Such exemplary implementation is shown in FIGS. 6A and 6B and FIGS. 7A and 7B.

Figure 6A:
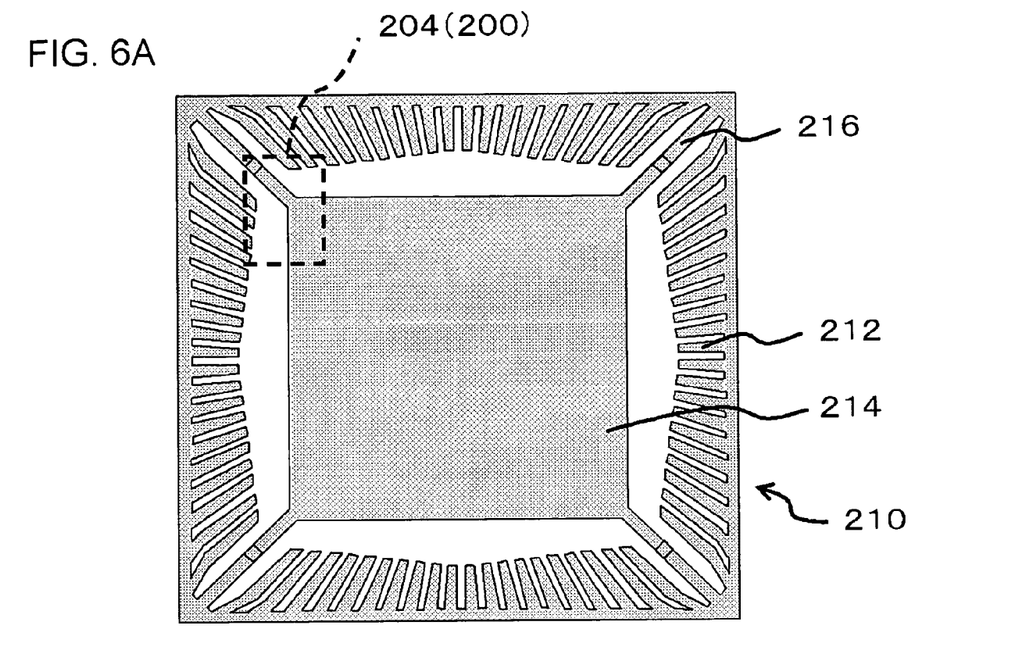
FIGS. 6A and 6B are diagrams, illustrating examples of recognition patterns in the embodiment of the present invention.
Figure 6B:
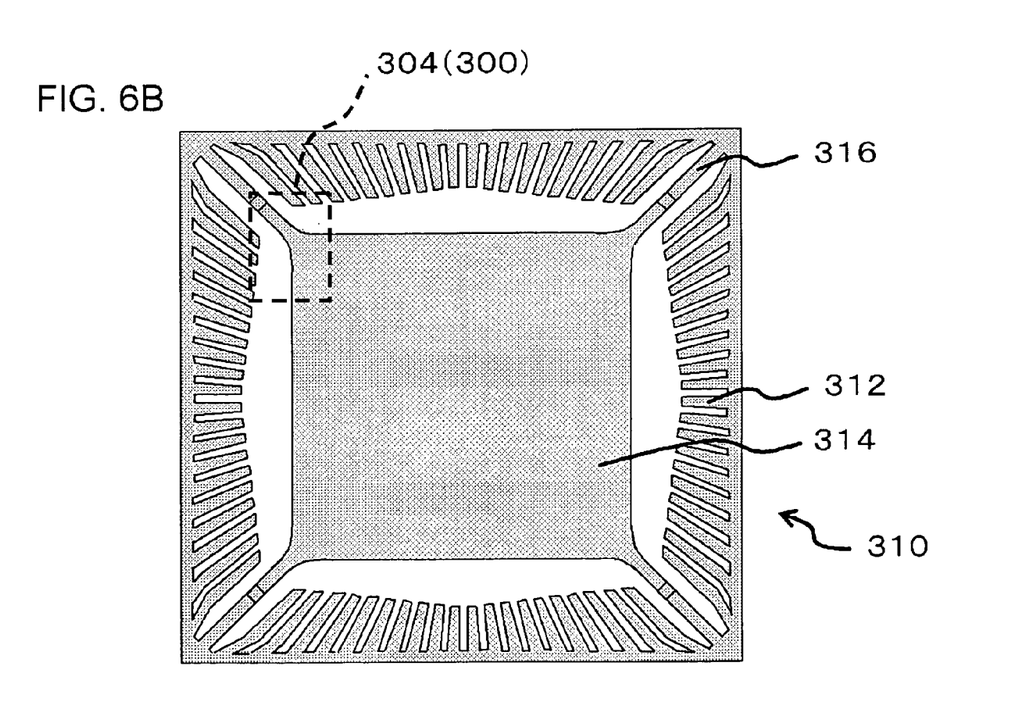

FIG. 6A illustrates an example, in which the recognition pattern 200 manufactured by company "A" is composed of a recognition pattern 204 that is obtained by picking up an image of a portion of the lead frame 210. FIG. 6B illustrates another example, in which the recognition pattern 300 manufactured by company "B" is composed of a recognition pattern 304 that is obtained by picking up an image of a portion of the lead frame 310.

Here, both of the recognition pattern 204 and the recognition pattern 304 are obtained by partially trimming out an upper-left corner section of the die pad of the associated lead frames, and both correspond to the same location. In other words, the recognition pattern 204 and the recognition pattern 304 are obtained by taking the images of the portions of a plurality of leads of the lead frame 210 and the lead frame 310, respectively, which are coupled to the same portion of a plurality of pads in the semiconductor chip.

Figure 7A:
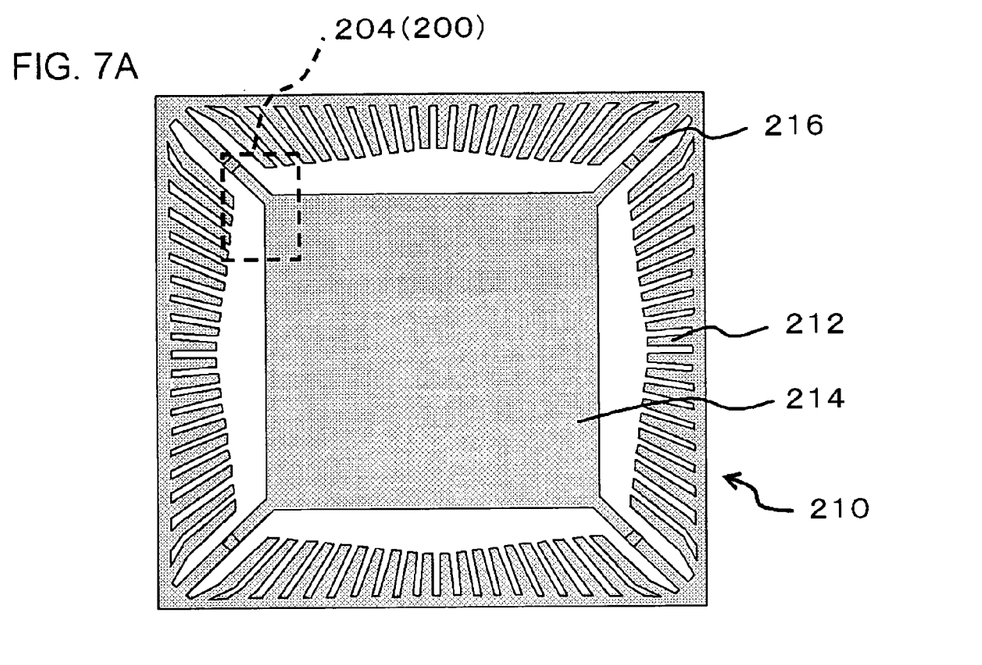
FIGS. 7A and 7B are diagrams, illustrating other examples of recognition patterns in the embodiment of the present invention.
Figure 7B:
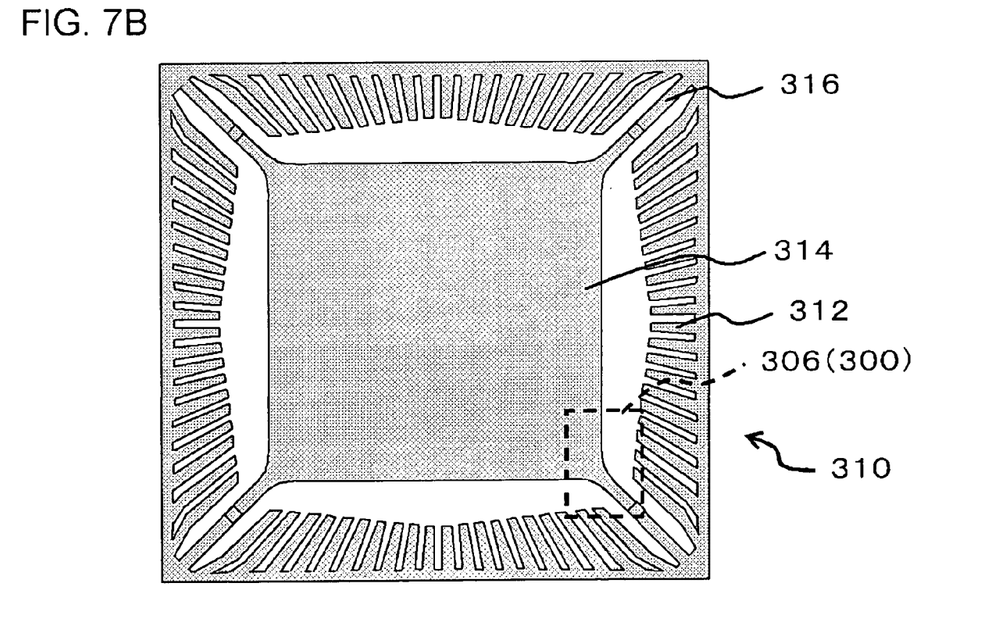

Alternatively, the recognition patterns of a plurality of objects may be obtained by taking the images of the different portions (position) of the objects, respectively. FIG. 7A illustrates an example, in which the recognition pattern 200 manufactured by company "A" is composed of a recognition pattern 204 that is obtained by picking up an image of a portion of the lead frame 210. FIG. 7B illustrates another example, in which the recognition pattern 300 manufactured by company "B" is composed of a recognition pattern 306 that is obtained by picking up an image of a portion of the lead frame 310. Here, the recognition pattern 204 is obtained by partially trimming out an upper-left corner section of the die pad 214 of the lead frame 210. On the other hand, the recognition pattern 306 is obtained by partially trimming out an upper-right corner section of the die pad 314 of the lead frame 310. The recognition pattern 204 and the recognition pattern 306 are obtained by trimming out the different portions of the lead frames having substantially similar configurations. In other words, the recognition pattern 204 and the recognition pattern 304 are obtained by taking the images of the portions of a plurality of leads of the lead frame 210 and the lead frame 310, respectively, which are coupled to the different portions of a plurality of pads in the semiconductor chip. In this way, different locations of a plurality of objects are allocated for the recognition patterns to provide an easy comprehension on which recognition pattern is defined as the ordinary recognition pattern during the pattern matching.

Figure 8A:
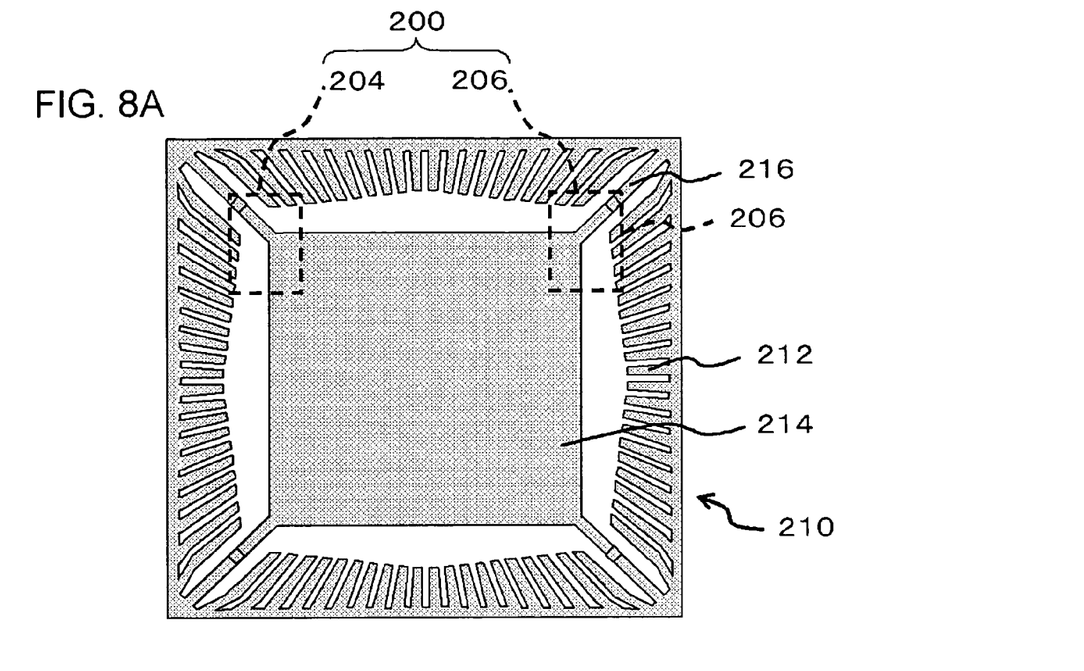
FIGS. 8A and 8B are diagrams, illustrating other examples of recognition patterns in the embodiment of the present invention.
Figure 8B:
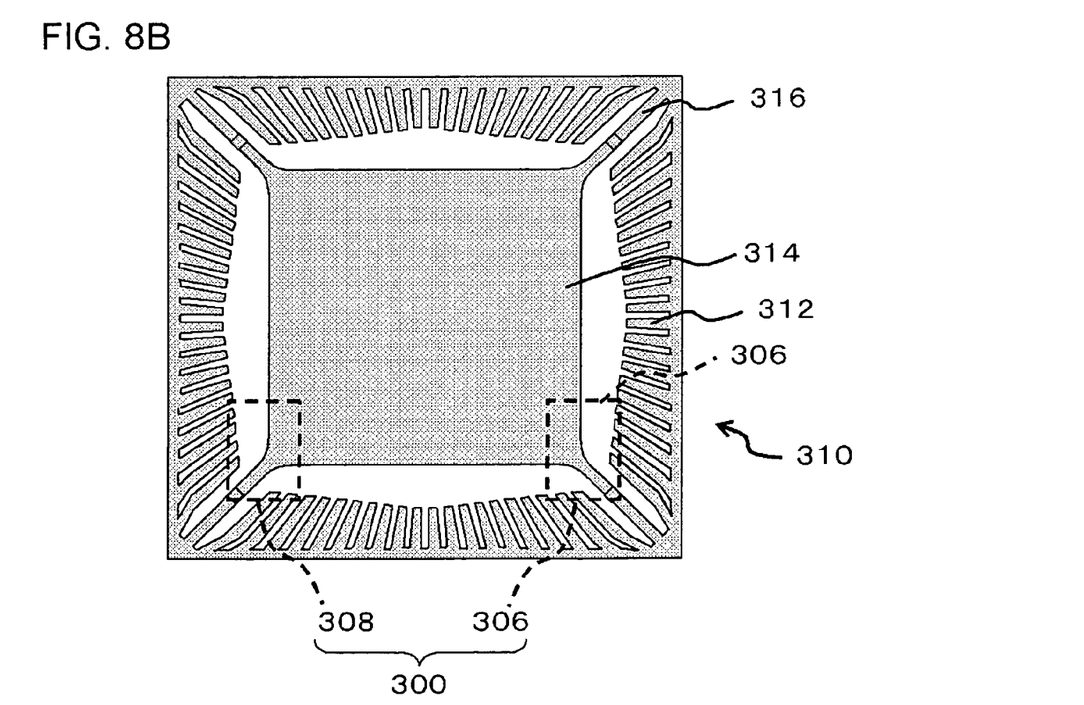

Further, as shown in FIGS. 8A and 8B, a combination of a plurality of image data in a plurality of locations may be assigned for the use as the recognition pattern for respective objects. Here, for example, the recognition pattern 200 manufactured by company "A" is composed of a combination of the recognition pattern 204 and the recognition pattern 206. Further, the recognition pattern 300 manufactured by company "B" is composed of a combination the recognition pattern 308 and the recognition pattern 306.

While the preferable embodiments of the present invention has been described above in reference to the annexed figures, it is intended that these are for illustrating the configurations of the present invention, and various types of other configurations except that described above may also be equally adopted.

The processing in the assignment-processing unit 106 to replace the ordinary recognition pattern with the auxiliary recognition pattern is not limited to that described above, and various processing may be adopted. For example, even though the processing of normally conducting the pattern matching with the auxiliary recognition pattern are not repeated for a predetermined cycles or more, if the pattern matching with the auxiliary recognition pattern are normally conducted at a certain rate in the latest pattern matching processing, the assignment-processing unit 106 may be allowed to replace the ordinary recognition pattern with the auxiliary recognition pattern.

While the examples of the portions of the lead frame including the die pads 214 or 314 employed as the recognition pattern have been illustrated in the above-mentioned preferable embodiments, the recognition pattern is not limited thereto, and, for example, the recognition pattern may be composed of only the lead sections.

Alternatively, the recognition pattern may include all leads of the bonding object. While the case of employing the lead frame has been exemplified in the above embodiments, the object is not limited to one having a frame geometry, and similar configuration may also be adopted when an alignment of a substrate having a plurality of leads is conducted.

Further, the processing for conducting the pattern matching with the auxiliary recognition pattern, and the processing for replacing the ordinary recognition pattern with the auxiliary recognition pattern as required, in the event of causing an error in the pattern matching with the ordinary recognition pattern after preparing the ordinary recognition pattern and the auxiliary recognition pattern, are not limited to the case of preparing a plurality of recognition patterns obtained by taking the image of the different objects as described in the above-mentioned preferable embodiments. For example, a plurality of image data obtained by taking the images of the same object under different conditions such as, for example, different light intensities, different dimensional area of images for being picked up and the like, may alternatively be utilized, even if the images of the same object are utilized.

Further, the technique of the present invention may alternatively be adopted for other applications such as, for example, an alignment of semiconductor chips and the like, in addition to the lead frames having a plurality of leads respectively coupled via bonding wires or the substrate having the leads formed therein. In other words, concerning the recognition pattern employed in the alignment of the semiconductor chips, different recognition patterns may be prepared for each of the different objects, and any one of these recognition patterns may be assigned for the ordinary recognition pattern, and the others may be assigned for the auxiliary recognition patterns.

In such case, when an error is caused in the pattern matching with the ordinary recognition pattern, the processing such as conducting the pattern matching with the auxiliary recognition pattern may be appropriately conducted.

It is apparent that the present invention is not limited to the above embodiment, and may be modified and changed without departing from the scope and spirit of the invention.

What is claimed is:

1. A pattern matching processing system for conducting a pattern matching of an input image data with a previously prepared reference recognition pattern when an alignment of a plurality of pads in a semiconductor chip with a lead frame having a plurality of leads respectively coupled via bonding wires or a substrate having the leads formed therein is conducted, said input image data containing data being obtained by picking up an image of at least a portion of said leads, which are objects for the alignment, said system comprising:

a storage unit configured to store first image data, obtained by picking up an image of said lead frame or at least a portion of said substrate serving as a first object, and second image data, obtained by picking up an image of said lead frame or at least a portion of said substrate serving as a second object that is different from said first object, respectively, and also storing one of said first image data and said second image data as an ordinary recognition pattern and an other as an auxiliary recognition pattern, said first image data and said second image data serving as said recognition pattern;

a recognition unit configured to conduct a recognition of said input image data via a first pattern matching with said ordinary recognition pattern stored in said storage unit, said recognition unit conducting a second pattern matching with said auxiliary recognition pattern stored in said storage unit if an error is generated in said first pattern matching; and an assignment-processing unit configured to assign said auxiliary recognition pattern to said ordinary recognition pattern, and assigning the pattern, which was originally assigned to said ordinary recognition pattern, to new auxiliary recognition pattern, on the basis of results of said first pattern matching with said ordinary recognition pattern and said second pattern matching with said auxiliary recognition pattern by said recognition unit.

2. The pattern matching processing system as set forth in claim 1, wherein said assignment-processing unit assigns said auxiliary recognition pattern to said ordinary recognition pattern and assigns the pattern, which is originally assigned to said ordinary recognition pattern, to the new auxiliary recognition pattern, when an error is caused in said first pattern matching with said ordinary recognition pattern by said recognition unit and when said second pattern matching with said auxiliary recognition pattern is successfully repeated for a predetermined number cycles or more.

3. The pattern matching processing system as set forth in claim 1, wherein said first object and said second object are manufactured in different locations.

4. The pattern matching processing system as set forth in claim 1, wherein said first object and said second object are manufactured in different periods of time.

5. The pattern matching processing system as set forth in claim 1, wherein a surface condition of said lead of said first object is different from a surface condition of said lead of said second object.

6. The pattern matching processing system as set forth in claim 1, wherein said first image data is obtained by picking up an image of a portion of said plurality of leads of said first object coupled to a first portion of said plurality of pads of said semiconductor chip, and said second image data is obtained by picking up an image of a portion of said plurality of leads of said second object coupled to a second portion of said plurality of pads of said semiconductor chip, said second portion is different from said first portion.

7. The pattern matching processing system as set forth in claim 1, wherein said first image data and said second image data are obtained by picking up images of portions of said plurality of leads of said first object and said second object coupled to the same portion of said plurality of pads of said semiconductor chip, respectively.

8. A tangible computer readable medium storing a program for conducting a pattern matching of an input image data with a previously prepared reference recognition pattern when an alignment of a plurality of pads in a semiconductor chip with a lead frame having a plurality of leads respectively coupled via bonding wires or with a substrate having the leads is conducted, said input image data containing data being obtained by picking up an image of at least a portion of said leads, which are objects for the alignment, said program to cause a computer to function as:

a storage unit configured to store first image data and second image data, respectively, and also to store one of said first image data and said second image data as an ordinary recognition pattern and an other as an auxiliary recognition pattern, said first image data and said second image data serving as said recognition pattern, said first image data being obtained by picking up an image of said lead frame or at least a portion of said substrate serving as a first object, and second image data being obtained by picking up an image of said lead frame or at least a portion of said substrate serving as a second object that is different from said first object;

a recognition unit configured to perform a recognition of said input image data via a first pattern matching with said ordinary recognition pattern stored in said storage unit, said recognition unit performing a second pattern matching with said auxiliary recognition pattern stored in said storage unit if an error is generated in said first pattern matching; and an assignment-processing unit, configured to assign said auxiliary recognition pattern to said ordinary recognition pattern, and assigning the pattern, which was originally assigned to said ordinary recognition pattern, to a new auxiliary recognition pattern, on a basis of results of said first pattern matching with said ordinary recognition pattern and said second pattern matching with said auxiliary recognition pattern by said recognition unit.

9. The storage medium as set forth in claim 8, wherein said assignment-processing unit assigns said auxiliary recognition pattern to said ordinary recognition pattern and assigns the pattern, which is originally assigned to said ordinary recognition pattern, to a new auxiliary recognition pattern, when an error is caused in said first pattern matching with said ordinary recognition pattern by said recognition unit and when said second pattern matching with said auxiliary recognition pattern is successfully repeated for a predetermined number of cycles or more.

10. A pattern matching apparatus, comprising:

a recognition pattern storage unit configured to store a first image data of a first object and second image data of a second object, one of the first image data and the second image data being stored as an ordinary recognition pattern and another one of the first image data and the second image data being stored as an auxiliary recognition pattern; and a recognition unit configured to first perform a matching of a pattern of an image with the ordinary recognition pattern and to secondly perform a matching of the pattern with the auxiliary recognition pattern when an error is detected in the matching of the pattern of the image with the ordinary recognition pattern; and an assignment-processing unit, the assignment-processing unit being configured to assign the auxiliary recognition pattern as the ordinary recognition pattern when the error is detected in the matching of the pattern of the image with the ordinary recognition pattern for a predetermined number of times.

11. The pattern matching apparatus according to claim 10, further comprising an image input unit to obtain the image, the image comprising a portion of a lead frame of an alignment object.

12. The pattern matching apparatus according to claim 10, further comprising an error-storage unit configured to store a detection of the recognition unit that the matching of the pattern with the auxiliary recognition pattern is successful.

* * * * *